United States Patent [19]

Sturm et al.

[11] Patent Number: 5,077,680
[45] Date of Patent: Dec. 31, 1991

[54] APPARATUS AND METHOD FOR PRINTER SPEED CONTROL

[75] Inventors: Thomas A. Sturm, Littleton; Kerry L. Shaklee, Brighton; James I. Martin, Evergreen, all of Colo.

[73] Assignee: Alliant Techsystems, Inc.

[21] Appl. No.: 671,488

[22] Filed: Mar. 19, 1991

[51] Int. Cl.⁵ .............................................. G06K 15/00
[52] U.S. Cl. ..................................... 395/105; 364/235; 364/DIG. 1
[58] Field of Search ............................... 364/518–520, 364/930 MS File, 235 MS File; 346/154, 134; 400/74, 61, 62, 67; 358/296

[56] References Cited

U.S. PATENT DOCUMENTS 3,609,319 9/1971 Clifford .............................. 364/520
3,761,880 9/1973 Kritz et al. ........................ 364/400

Primary Examiner—Arthur G. Evans
Attorney, Agent, or Firm—James R. Young

[57] ABSTRACT

Disclosed is a system for controlling the print speed of a color graphics printer to allow the printer to track the host data rate adjusted for image resolution. The print speed adjusts automatically to match the effective host data rate in print lines per second, and maintains a well behaved speed response characteristic independent of data resolution. The system filters abrupt changes in the rate of the data being received from the host so that the printer operates within its slew rate limitations.

18 Claims, 8 Drawing Sheets

| | 813 SPEED INDEX | 814 UP THRESHOLD | F L A G 820 | 816 DOWN THRESHOLD | INT. 818 |
|---|---|---|---|---|---|
| 802 | 86 | 32767 | M | 630 | 360 |
| 804 | 85 | 665 | M | 625 | 364.24 |
| 806 | 84 | 660 | M | 620 | 368.58 |
| | ⋮ | ⋮ | ⋮ | ⋮ | ⋮ |
| 808 | 2 | 250 | M | 230 | 17884.78 |
| 810 | 1 | 245 | M | 225 | 42528.82 |
| 812 | 0 | 240 | S | 221 | 333.34 |

APPARATUS AND METHOD FOR PRINTER SPEED CONTROL

CROSS REFERENCE TO RELATED APPLICATIONS

This application is related to application Ser. No. 7/650,690 filed Feb. 5, 1991 of Sturm, et al., entitled "CRT Beam Deflection Control System."

FIELD OF THE INVENTION

This invention relates to computer systems and more particularly to printers within such computer systems. Even more particularly, the invention relates to controlling the print speed of a printer attached to a computer system.

BACKGROUND OF THE INVENTION

Variable speed photographic process printers normally operate at either a default speed or a user selectable speed. Typically, the print speed can be configured by switch settings, a front panel menu, programmatically from the processor, or a combination of these methods. Also, a printer will typically start printing at a fixed rate when the print buffer contains more than a certain threshold of lines to print, and the printer will pause whenever it has printed all the data in the print buffer. Some prior art printers also change print speed depending on the available data lines in the print buffer. The methods for controlling these printers typically have response characteristics which vary with data resolution and frequency of receipt of new lines.

One problem with prior art printers is that if the printer responds too rapidly or it exhibits an underdamped behavior, it may leave visible blemishes or artifacts on the printed image. A risk of leaving artifacts always exists when the printer stops.

Another problem with prior art printers, particularly those printers printing at a high resolution, is a significant increase in registration problems if the printer starts and stops too frequently.

Still another problem with prior art printers is the difficulty of varying the print speed if the printer is capable of printing at various data resolutions. That is, the number of print lines printed per input data line is higher for low resolution data because multiple lines must be printed for each line of input data when printing in low resolution. Therefore, when the input data rate changes, the print rate will change more rapidly when printing lower resolution data then it changes when printing higher resolution data. If this variation in the rate of change is not controlled, the media drive system and the system that places data onto the media can lose synchronization causing blemishes or artifacts to be left on the printed media.

There is need in the art then for a printer that will vary print speed relative to the input data rate, filtering abrupt changes in host data rate and attempting to keep the print media moving by frequently adjusting print speed relative to available print lines. There is further need in the art for such a printer control system that varies the print speed relatively independent of the resolution of the data being printed. The present invention meets these needs.

A description of other aspects of the printer that incorporates the present invention can be found in application Ser. No. 07/650,690 filed Feb. 5, 1991 of Sturm, et al., entitled "CRT Beam Deflection Control System," which is specifically incorporated by reference for all that is disclosed therein.

SUMMARY OF THE INVENTION

It is an aspect of the present invention to control the print speed of a printer attached to a computer system.

It is another aspect of the invention to maintain a well behaved speed response characteristic independent of data resolution.

Yet another aspect of the invention to limit changes in the print speed to a rate that is within the slew rate limitations of the printer.

A further aspect is to periodically adjust the print speed to attempt to keep the print media moving at all times.

A still further aspect of the invention is to maintain a minimum amount of data within a print window buffer of the printer.

The above and other aspects of the invention are accomplished in a system for controlling the print speed of a color graphics printer to allow the printer to track the host data rate adjusted for image resolution. The print speed adjusts automatically to match the effective host data rate. A significant feature of the system is that it maintains a well behaved speed response characteristic independent of data resolution. The system filters abrupt changes in the rate of the input data being received from the host so that the printer operates within its slew rate limitations.

The printer that incorporates the present invention requires that a minimum number of print lines be maintained within a print window buffer in the printer. This requirement is necessary because the printer uses a CRT to output three separate color stripes for each line on the print media. Because of the particular CRT used in the printer, these stripes may be a significant distance apart, therefore, a print window buffer containing a minimum number of print lines must be maintained at all times. The system of the present invention maintains this minimum number of print lines, and halts the printing process while leaving the minimum number of print lines in the print window buffer when the host stops sending data to the printer.

BRIEF DESCRIPTION OF THE DRAWINGS

The above and other objects, features, and advantages of the invention will be better understood by reading the following more particular description of the invention, presented in conjunction with the following drawings, wherein:

FIG. 8 shows a table used to vary the print speed.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
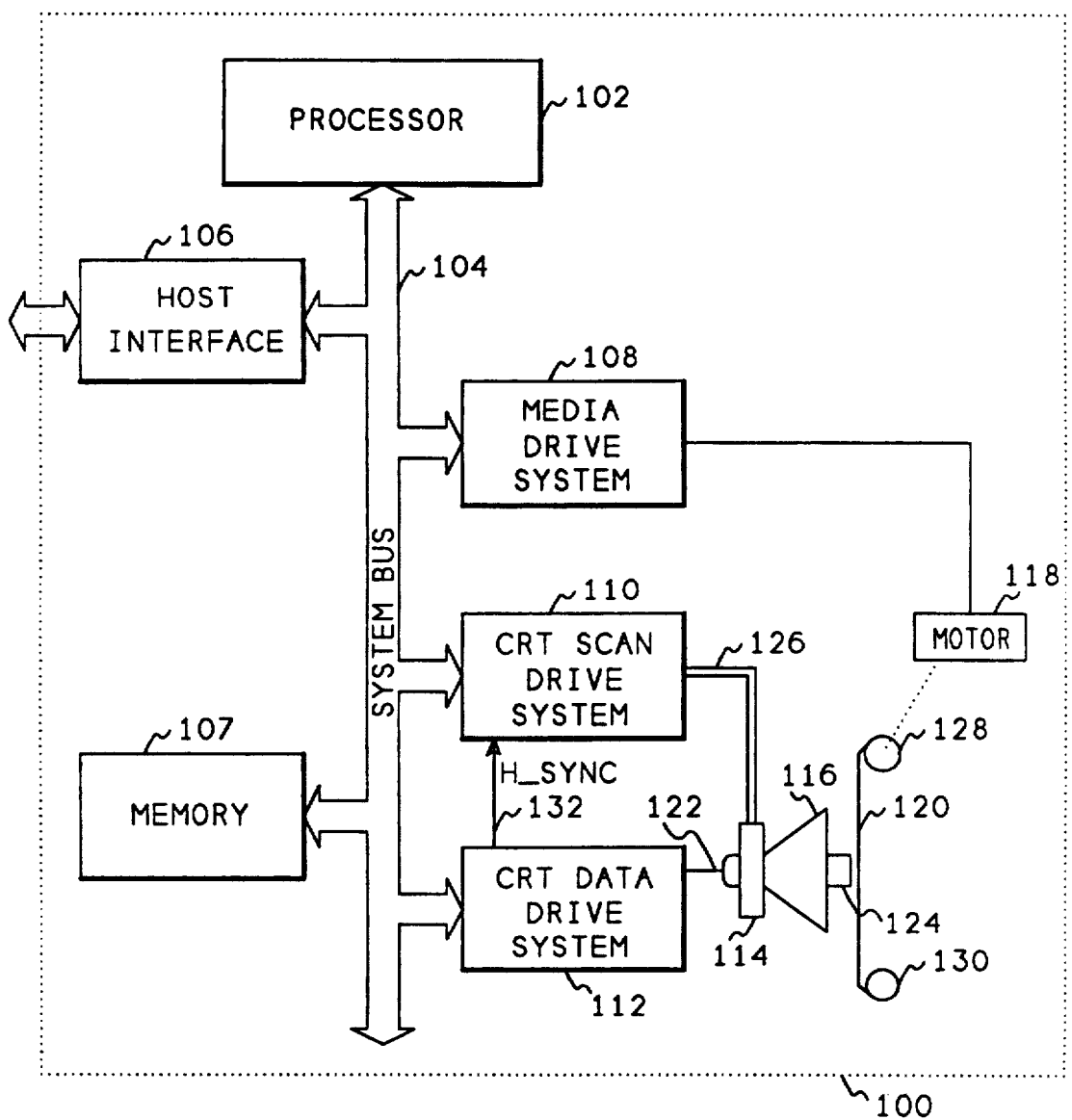
FIG. 1 shows a block diagram of a printer incorporating the present invention.

FIG. 1 shows a block diagram of a printer that incorporates the present invention. Referring now to FIG. 1, a printer 100 contains a processor 102 which communicates to other components of the system over a system bus 104. The processor 102 uses a host interface 106 to receive data from a host system (not shown). The processor 102 stores this received data in memory 107, and, during processing, the data is transferred from the memory 107 to the CRT data drive system 112. The output 122 of the CRT data drive system 112 is connected to a CRT 116 and used to modulate the electron beam within the CRT 116. Data displayed on the face of the CRT 116 is conducted through a CRT fiber optic faceplate 124 to print media 120. The print media 120 is a photosensitive media capable of recording the image displayed on the CRT and conducted through the CRT fiber optic faceplate 124. Deflection of the electron beam of the CRT 116 is controlled by a CRT scan drive system 110 whose output 126 is connected to a yoke 114 of the CRT 116. The CRT data drive system 112 controls the start of each horizontal trace through an H_ SYNC signal 132.

The print media 120 is moved by a paper roll 128 which is powered by a motor 118. The motor 118 is operated by a paper drive system 108 which is controlled over the system bus 104 by the processor 102. The present invention, which controls the media drive system 108, is contained in the processor 102.

Operation of the system begins when data is received over the host interface 106. The processor 102 takes the data from the host interface 106 and stores the data within a print data buffer in memory 107. The selected color components of a data line are sent to the CRT data drive system 112 where they are used to modulate the CRT. The paper drive system 108 is used to position the media 120 in front of either a red, green, or blue phosphor stripe on the face of the fiber optic faceplate 124. The CRT scan drive system 110 is then activated to scan the electron beam across the appropriate phosphor stripe while the CRT data drive system 112 modulates the CRT beam intensity to expose the print media. After this exposure, the print media is moved a fixed distance, and the process is repeated for one of the other colors. One print line of data is complete after all three phosphors—red, green, and blue—have been scanned. While the print lines are being exposed, the present invention controls the speed of the print media to filter abrupt changes in host data rate and to attempt to keep the media constantly in motion.

Figure 2:
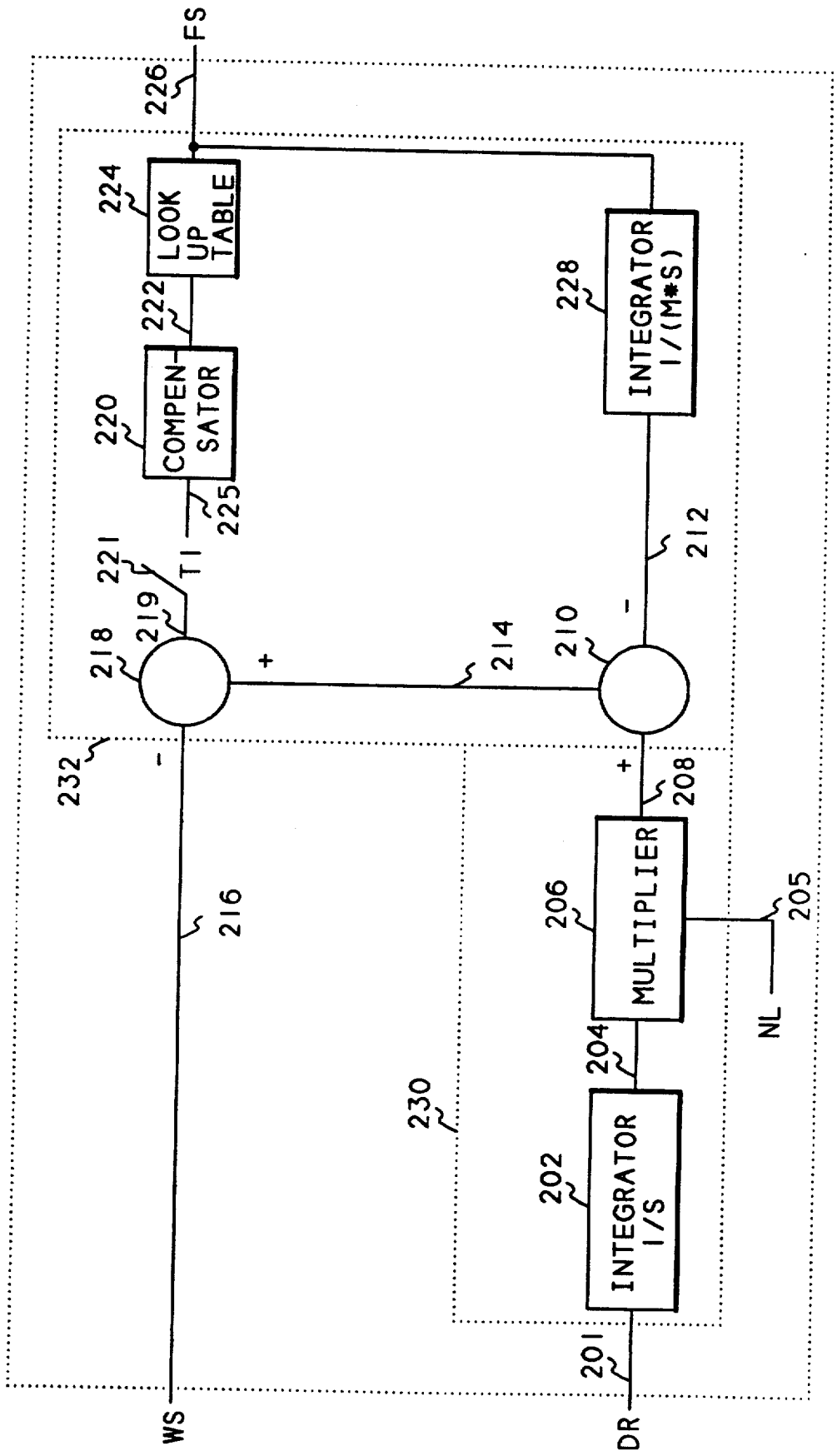
FIG. 2 shows a block diagram of a control system representative of the present invention.

FIG. 2 shows a block diagram of a control system representative of the invention. Referring now to FIG. 2, the data rate DR 201, which is the rate at which the printer is receiving data from the host, is input into an integrator 202. The integrator 202 integrates the data rate over time to produce a number of data lines received 204 which is input to a multiplier 206. The other input to the multiplier 206 is the number of print lines per data line received NL 205. That is, NL 205 is the repetition factor of each data line.

As described above, the printer incorporating the present invention is a color printer that prints on a photosensitive media. This printer has the capability of scaling the image resolution, such that a line of input data may be repeated multiple times. The repetition, or scale factor, is the number NL 205, which is the second input to the multiplier 206. The multiplier 206 multiplies the number of data lines received 204 by the repetition factor 205 to produce a value 208 which is the number of input print lines that result from the data lines sent to the printer by the host.

The number of input print lines 208 is sent to a summing junction 210. The other input to the summing junction 210 is the number of print lines that have been printed 212. The output 214 of the summing junction 210 is the number of print lines remaining to be printed. This number 214 is input to a second summing junction 218. The other input to the summing junction 218 is the size of the print window WS 216. Therefore, the summing junction 218 compares the number of print lines remaining to print 214 to the size of the print window 216 to produce an error value 219, which is the number of print lines waiting to print that is greater than the size of the print window. This error value 219 is sent to a sampler 221. After each print line is printed a sampled error value 225 is sent to a compensator 220. The sampled error value 225 is compared to the up and down thresholds for the present speed index (see FIG. 8). The difference between the up and down thresholds is a hysteresis value. If the sampled error signal 225 is between the thresholds for the present speed index, the output 222 of the compensator 220 will not change. If the sampled error value 225 is greater than the up threshold, the output 222 will increment by one count. If the sampled error value 225 is less than the down threshold, the compensator output 222 will decrement one count. The difference between successive up thresholds and successive down thresholds is a constant equal to five. The smaller this constant, the faster the controller responds to changes but the response is more underdamped. This process will be more fully described below with respect to FIGS. 7 and 8.

The output 222 of the compensator 220 is connected to a look up table 224. The output 222 is used as a speed index into the look up table 224 (see also FIG. 8) to produce a value FS 226 which is the stepper motor rate for the stepper motor 118 (FIG. 1) that moves the print media of the printer. In the preferred embodiment, the lookup table contains 86 entries which are closely spaced to minimize speed steps and minimize acceleration. Therefore, the difference between the number of print lines waiting to print 214 and the window size 216, after being adjusted by the compensator 220 and the look up table 224, produces a stepper motor rate FS 226.

The stepper motor rate 226 is also connected to the input of an integrator 228. The integrator 228 integrates the stepper motor rate over time to produce the total number of lines printed 212. The scale factor M in the integrator 228 is the number of motor steps per print line, which is three in the preferred embodiment. The number of print lines printed 212 is input to the summing junction 210 as described above.

Therefore, the control system described above with respect to FIG. 2 causes the print speed, as defined by the stepper motor rate 226, to automatically track the host data rate, as defined by the DR signal 201, and as adjusted by the repetition factor, NL 205. The maximum printer slew rate is limited by the compensator 220 so that the maximum printer acceleration is not exceeded. Further, whenever printing has to stop during the printing process, the printer data buffer will contain the number of data lines required to fill the print window, as defined by the window size signal WS 216.

Figure 3:
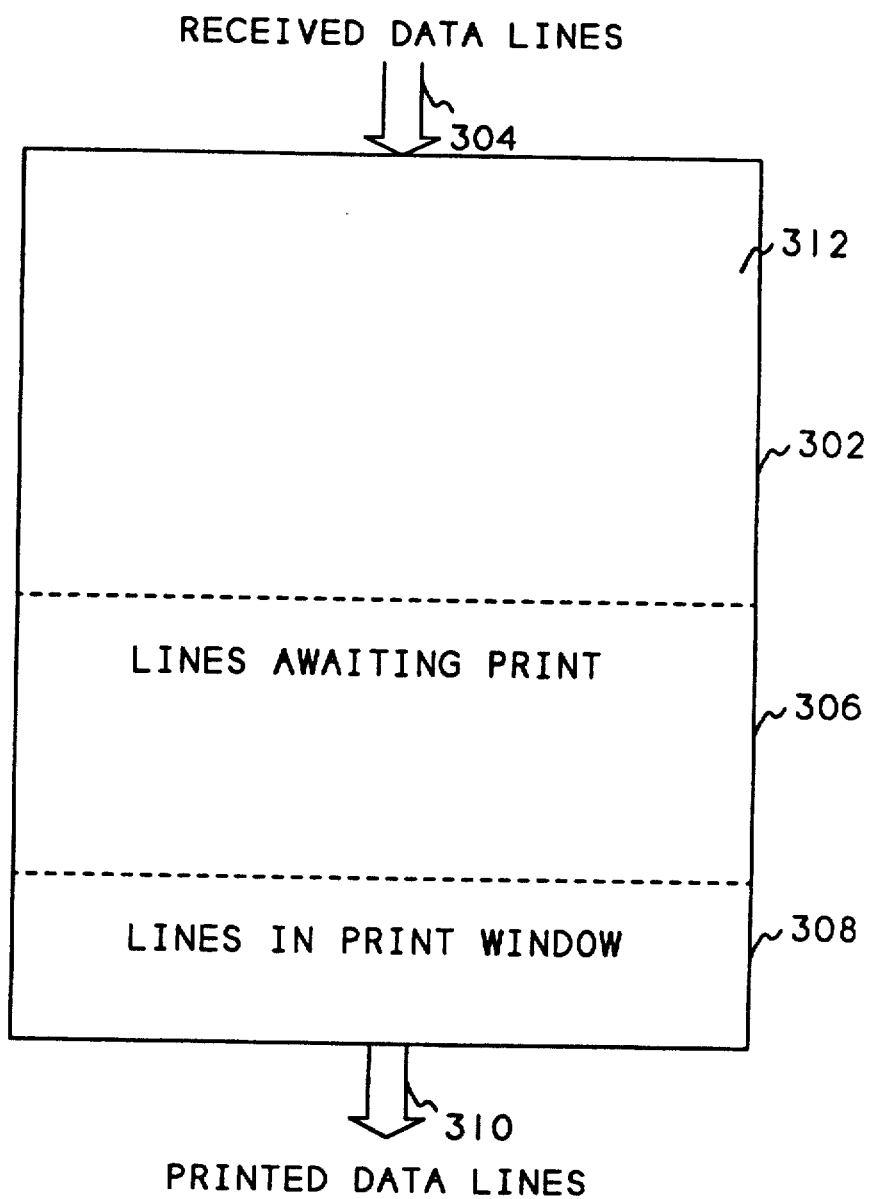
FIG. 3 shows a diagram of the print data queue of the invention.
Figure 4:
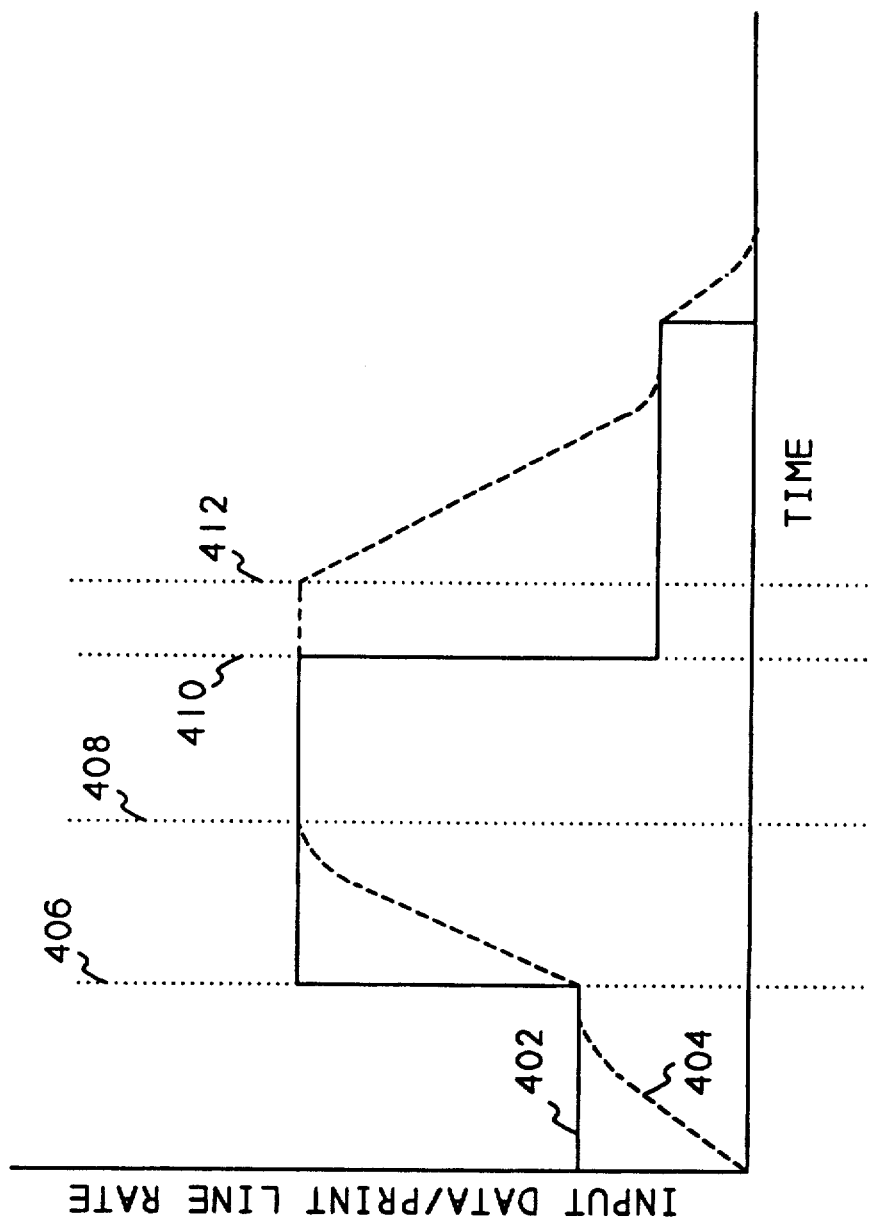
FIG. 4 shows a timing chart illustrating the rate of change at which the printer increases or decreases print speed.

FIG. 3 shows a diagram of the data buffer within the printer of the present invention. Referring now to FIG. 3, the data buffer 302 receives data lines 304 from the host computer system through the host interface 106 (FIG. 1). The data buffer 302 is a first in first out (FIFO) buffer, so when a data line 304 arrives it is placed in the buffer as the last line in the lines awaiting print area 306. The lines in print window area 308 is the minimum number of lines necessary to be maintained within the print window. This minimum number of lines is required in order to properly print all three colors using the color CRT of the printer. After all three color lines of the data line at the bottom of the FIFO have been repeated the number of times determined by the repetition table (FIG. 6), the line is flushed from the buffer, as indicated by the printed data lines arrow 310. The area 312 above the lines awaiting print area 306 represents the remaining capacity of the print buffer 302. FIG. 4 shows a graph of the input line data rate as received by the printer, scaled by the repetition factor, and the print rate of data being printed by the printer, over time. Referring now to FIG. 4, the solid line 402 shows an example input data rate, after being scaled by the repetition factor, as might be received by the printer from a host system. Dashed line 404 shows the print line rate as the printer responds to the input data rate 402 received from the host system. Dotted line 406 identifies a point in time at which the input data rate dramatically increased, as indicated by the vertical change in the input data rate solid line 402. At the point in time 406, the print line rate 404 started an increase that allowed it to rise to the same data rate as the scaled input data at the point in time identified by dotted line 408. The print line rate then matches the scaled input data rate until the point in time identified at dotted line 410 where the input data rate dramatically decreased. The print line rate remained at the higher rate, because of hysteresis, before it starts to decrease at the point in time identified by dotted line 412. This FIG. 4 illustrates that the print line rate follows the input data rate, however, the increases and decreases in print line rate remain within the slew rate of the printer.

Figure 5:
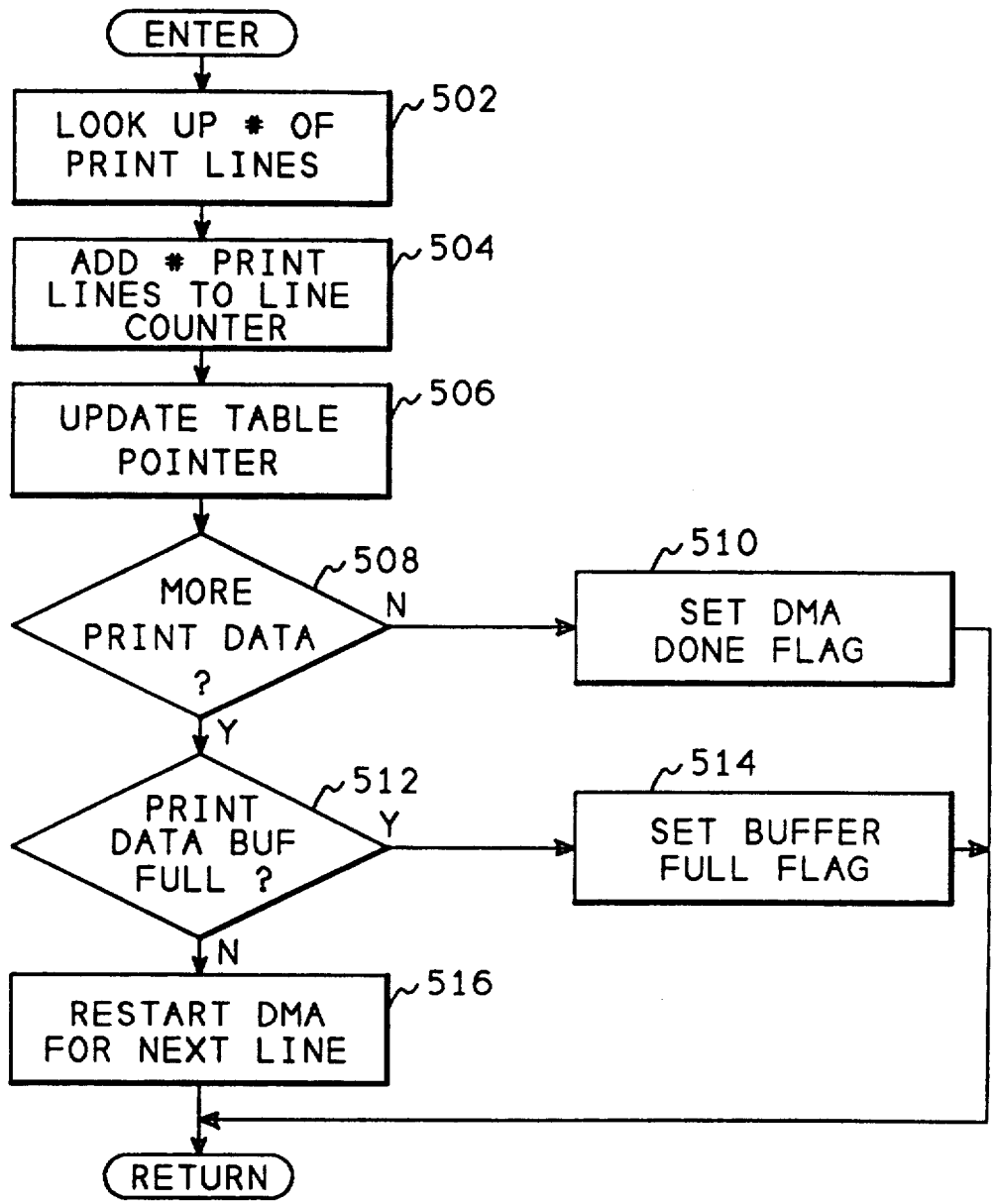
FIG. 5 shows a flow chart of the interrupt routine of the present invention that computes the number of lines in the print queue.
Figure 6:
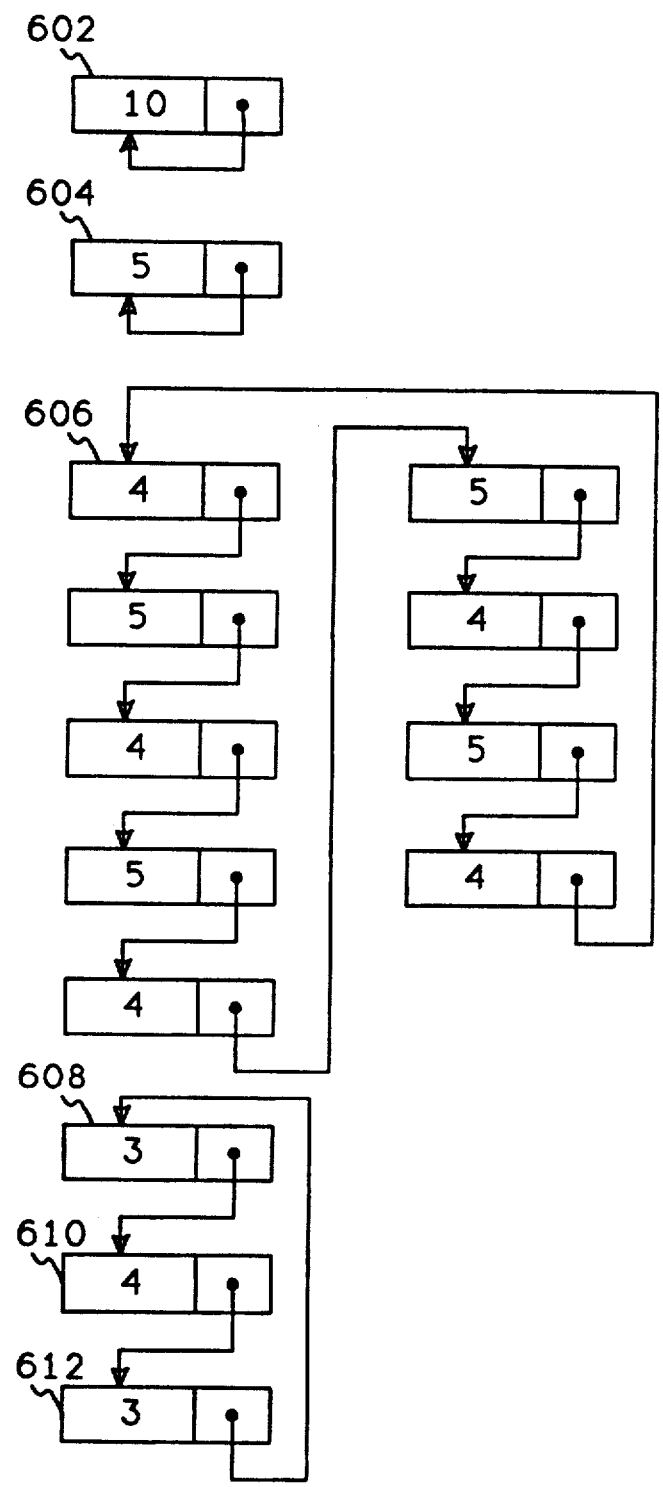
FIG. 6 shows a table used to determine the number of print lines per input data line.
Figure 7:
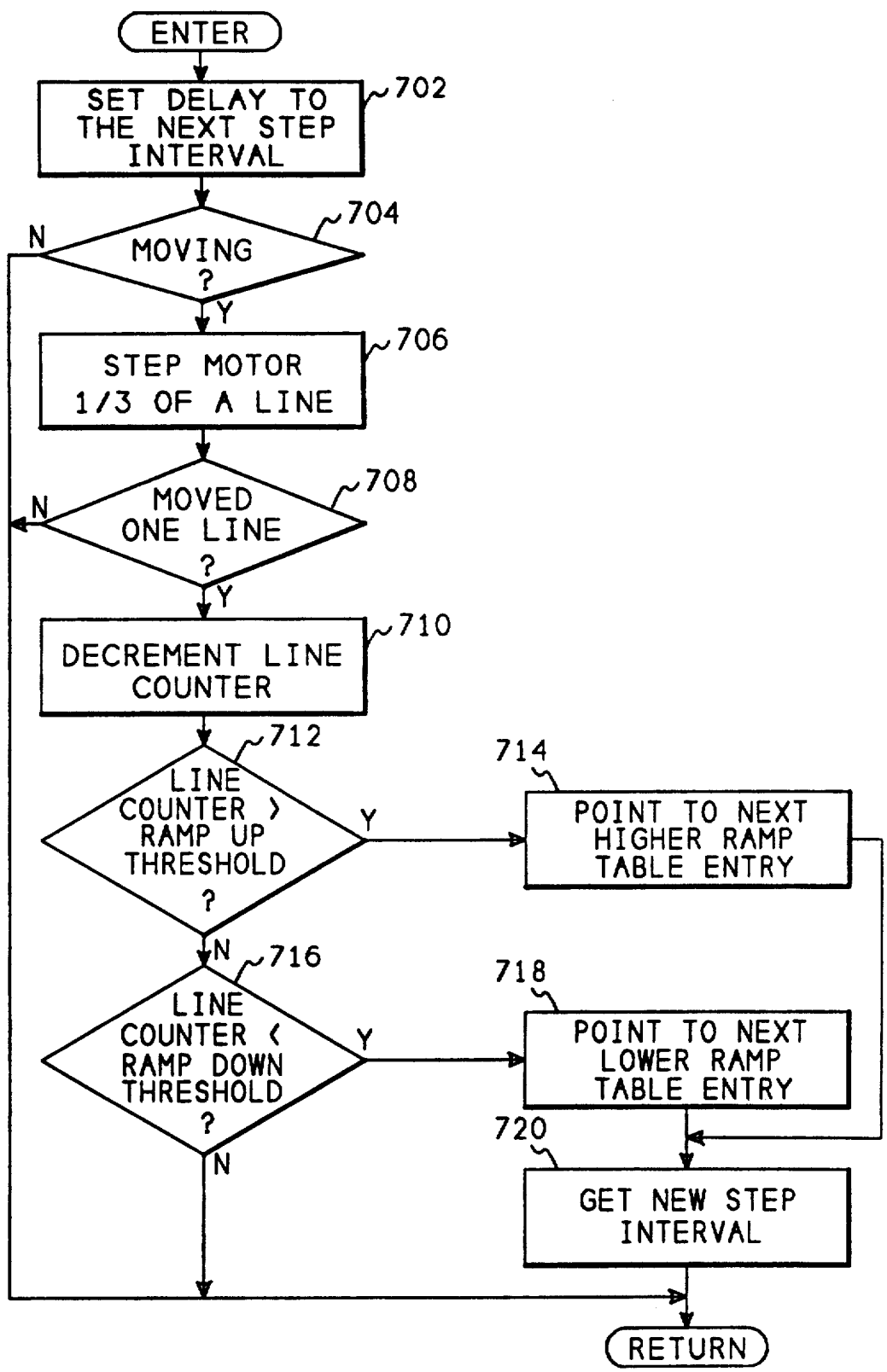
FIG. 7 shows a flow chart of the main interrupt routine of the present invention.

FIGS. 5 and 7 show flow charts of the system of the present invention implemented as software running within the processor 102 (FIG. 1), and FIGS. 6 and 8 shows tables used with the software of FIGS. 5 and 7. FIG. 5 shows a flow chart of that portion of the control system surrounded by dotted line 230 in FIG. 2, and the flow chart of FIG. 7 shows that portion of the system surrounded by the dotted line 232 in FIG. 2. The flow charts of FIGS. 5 and 7 are both interrupt routines, called when certain events occur within the printer system. FIG. 5 is called after an entire line of data has been received over the host interface 106 (FIG. 1), and FIG. 7 is called by a timer interrupt set up by the last call to FIG. 7. Referring now to FIGS. 5 through 8, after a line of data has been received from the host, FIG. 5 is called. After entry, block 502 looks up the number of print lines per dot row (repetition factor) for this data line from a table such as one of the tables shown in FIG. 6.

The tables of FIG. 6 are by way of example only. A repetition table is built dynamically for a particular resolution, when printing is started, therefore only one table exists at a time. A table is built as a linked list to achieve a repetition factor. Since the printer is capable of printing 1000 lines per inch, and since partial print lines are not possible, successive print lines printed at different repetition factors are necessary if the resolution does not evenly divide into 1000. For example, if data is being printed at 100 lines per inch, and since 1000 divided by 100 is 10, block 502 would use table 602, which has a single entry with a print repetition factor of 10.

If the print resolution is set to 300 lines per inch, table 608 would be used. Since 300 does not evenly divide into 1000, table 608 is a linked list of three entries. Ideally, each print line should be repeated three and one-third times, but since a partial line cannot be printed, the linked list defines three repetitions to be used for three successive input data lines. The first input data line received will print with a repetition factor of three, thus using entry 608. The next input data line will print with a repetition factor of four, using entry 610. The next input data line will print with a repetition factor of three, using list entry 612. Since the list is circular, the next input data line will again use entry 608 to print with a repetition factor of three. In this manner, every three data lines will print with repetition factors of three, four, and three, resulting in at total of ten print lines for every three input data lines. This averages to a print repetition factor of three and one-third, which achieves a resolution of 300 lines per inch.

The repetition factor is even more complicated for 225 lines per inch, represented by the table starting with entry 606, which requires a linked list of nine entries. This list alternates repetitions of four and five to accomplish an effective resolution of 225 lines per inch. In this manner, any print resolution between one and 1000 can be configured by an appropriate linked list similar to the ones defined in FIG. 6.

Block 504 (FIG. 5) adds the repetition factor obtained from the table to a print line counter. This is equivalent to the multiplier 206 (FIG. 2) since only one line of input data has been received from the host. After updating the print line counter, block 506 updates a pointer to point to the next entry for the next print repetition factor. Since the list entries are circular, when the end of the list is reached, the next update will point back to the beginning of the list.

Block 508 then determines if more data is expected from the host system. If no more data is expected, block 508 transfers to block 510 which sets a done flag, to alert the background software, before returning from the interrupt. If more data is expected, block 508 transfers to block 512 which determines whether the print data buffer is full. If the print data buffer is full, block 512 transfers to block 514 which sets a buffer full flag before returning from the interrupt. The buffer full flag will cause the background software to restart the DMA controller in the host interface 106 (FIG. 1) when more space is available in the print data buffer. If the print data buffer has space remaining, block 512 goes to block 516 which restarts the DMA controller in the host interface 106 (FIG. 1) to transfer the next data line from the host. Block 516 then returns from the interrupt.

FIG. 7 is called with each timer interrupt. After entry into FIG. 7, block 702 sets a delay to the next interrupt, which is variable, to set the print speed. This delay is obtained from the table of FIG. 8, as will be described below. Block 704 then checks the flag entry 820 (FIG. 8) in the current table entry to determine if the print media is moving. If the print media is not moving, no other action needs to occur, so block 704 returns from the interrupt. If the print media is moving, block 704 transfers to block 706 which sends a step signal, FS 226 (FIG. 3) to cause the stepper motor 118 (FIG. 1) to step one-third of a print line. Block 708 then determines if the media has moved one complete print line. If not, block 708 just returns from the interrupt. If the media has moved one complete print line width, that is, three steps, block 708 transfers to block 710 which decrements the print line counter by one. Block 712 then uses a pointer into the table of FIG. 8 to determine whether the print line counter is greater than the ramp up threshold in the table entry.

FIG. 8 shows the look up table 224 (FIG. 3). In this table, each entry has a ramp up threshold 814, which is used to determine if the print media speed should be increased. Each table entry also has a ramp down threshold 816 which is used to determine whether the media speed should be decreased. The interval entry 818 is the delay used in block 702 to set up the next interrupt time. Lastly, each entry in the table of FIG. 8 has a flag which indicates whether the media is moving when the entry is being used. An "S" in the flag entry indicates that the media is stopped while an "M" in the flag entry indicates that the media is moving.

If the line counter is greater than the ramp up threshold of the current entry, block 712 transfers to block 714 which changes the current entry pointer to point to the next higher entry, and then block 720 gets the new step interval 818 from that entry. This new step interval will be used by block 702 after the next interrupt.

If the line counter is less than or equal to the ramp up threshold, block 712 transfers to block 716 which determines if the line counter is less than the ramp down threshold. If the line counter is less than the ramp down threshold, block 716 transfers to block 718 which updates the current pointer to point to the next lower entry and then block 720 gets the new step interval 818 from that entry. If the line counter value is greater than or equal to the ramp down threshold, block 716 just returns from the interrupt, thus the print speed remains constant.

The difference between the ramp up and ramp down threshold values in an entry of FIG. 8 is the hysteresis value, discussed above with respect to FIG. 2. The up threshold 814 represents the upper limit of an increase in print lines to be printed before FIG. 7 will use the next higher entry in the table. The down threshold 816 represents the lower limit of a decrease in print lines to be printed before FIG. 7 will use the next lower entry in the table. Thus the difference between the up threshold and the down threshold of an entry represents a dead band. If the print lines to be printed remains within the dead band, the media speed will not be changed.

The difference between the speed intervals in the table represents a 10.8 print lines per second change in velocity. Since the flowchart of FIG. 7 never changes the current pointer by more than one entry, the print media speed is never increased by more than 10.8 lines per second, thus keeping the printer within its slew rate. Since the lowest down threshold 816 value is 221, the printer will always stop with more than the required 219 print window lines.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A system for controlling the printing speed of a printer comprising:

input data line counter means for determining the number of data lines received;

multiplier means for multiplying said input data line counter means by a repetition factor to obtain a number of print lines received;

means for computing the number of print lines previously printed;

means for subtracting said number of print lines previously printed from said print lines received to compute a print line counter.

means for computing an error value by subtracting a window buffer size from said print line counter;

compensator means for computing a speed index from said error value;

means for converting said speed index to a motor step rate; and means connected to said motor step rate for controlling said printing speed.

2. The system of claim 1 wherein said compensator means further comprises hysteresis means for retaining said speed index at a previous value until said error value falls outside a pair of predetermined threshold values.

3. The system of claim 2 wherein said predetermined threshold values are different for different printing speeds.

4. The system of claim 1 wherein said compensator means further comprises means for limiting said speed index to cause said speed index to change by no more than a predetermined amount each time said compensator computes said speed index.

5. The system of claim 4 wherein said predetermined amount is one.

6. The system of claim 1 wherein said compensator means further comprises:

means for changing said speed index only when said error value changes by a predetermined amount; and means for changing said predetermined amount to vary print speed response time.

7. The system of claim 1 wherein said means for converting said speed index to a motor step rate comprises sequential entries in a lookup table means indexed by said speed index whereby said table lookup means limits speed steps and slew acceleration.

8. A system for controlling the printing speed of a printer comprising:

means for adding a number of input data lines, multiplied by a repetition factor, to a print line counter;

means for decrementing said print line counter each time a print line is printed;

means for computing an error value by subtracting a window buffer size from said print line counter;

compensator means for computing a speed index from said error value;

means for converting said speed index to a motor step rate; and means connected to said motor step rate for controlling said printing speed.

9. The system of claim 8 wherein said compensator means further comprises hysteresis means for retaining said speed index at a previous value until said error value falls outside a range of values between a pair of predetermined threshold values.

10. The system of claim 9 wherein said predetermined threshold values are different for different printing speeds.

11. The system of claim 9 wherein said compensator means further comprises means for limiting said speed index to cause said speed index to change by no more than a predetermined amount each time said compensator computes said speed index.

12. The system of claim 11 wherein said predetermined amount is one.

13. The system of claim 8 wherein said compensator means further comprises:

means for changing said speed index only when said error value changes by a predetermined amount; and means for changing said predetermined amount to vary print speed response time.

14. A method for controlling the printing speed of a printer comprising the steps of:

(a) adding a repetition factor value to a print line counter each time a data line is received;

(b) computing an error value by subtracting a window buffer size from said print line counter;

(c) computing a speed index from said error value; and (d) converting said speed index to a motor step rate;

(e) applying said motor step rate to a motor of the printer to control said printing speed with said motor rate; and (f) subtracting one from said print line counter each time a print line is printed.

15. The method of claim 14 wherein step (c) further comprises the step of retaining said speed index at a previous value until said error value falls outside a range of values between a predetermined pair of threshold values.

16. The method of claim 15 further comprising the step of varying said predetermined threshold values with printing speed.

17. The method of claim 14 wherein step (c) further comprises the step of limiting said speed index to changing no more than a predetermined amount each time step (c) is performed.

18. The method of claim 17 wherein said predetermined amount is one.

* * * * *

UNITED STATES PATENT AND TRADEMARK OFFICE
CERTIFICATE OF CORRECTION

PATENT NO. : 5,077,680

DATED : Dec. 31, 1991

INVENTOR(S) : Thomas A. Sturm, Kerry L. Shaklee, James L. Martin

It is certified that error appears in the above-identified patent and that said Letters Patent is hereby corrected as shown below:

On the title page, item [75]

In the "Inventors" section, page 1, cancel "James I. Martin" and substitute --James L. Martin--.

Signed and Sealed this

Twenty-fourth Day of August, 1993

*Attest:*

BRUCE LEHMAN

*Attesting Officer*   *Commissioner of Patents and Trademarks*